(12) United States Patent
James et al.

(10) Patent No.: US 11,783,547 B2
(45) Date of Patent: Oct. 10, 2023

(54) APPARATUS AND METHOD FOR DISPLAYING AN OPERATIONAL AREA

(71) Applicant: BAE Systems plc, London (GB)

(72) Inventors: Ian Geoffrey James, Preston (GB); Edmond Richard Ridge, Preston (GB); David John Simm, Preston (GB); Malcolm Grant Pigott, Preston (GB)

(73) Assignee: BAE Systems plc, London (GB)

( * ) Notice: Subject to any disclaimer, the term of this patent is extended or adjusted under 35 U.S.C. 154(b) by 353 days.

(21) Appl. No.: 16/643,765

(22) PCT Filed: Sep. 12, 2018

(86) PCT No.: PCT/GB2018/000122
§ 371 (c)(1),
(2) Date: Mar. 2, 2020

(87) PCT Pub. No.: WO2019/048812
PCT Pub. Date: Mar. 14, 2019

(65) Prior Publication Data
US 2021/0035365 A1    Feb. 4, 2021

(30) Foreign Application Priority Data

Sep. 11, 2017  (EP) .................................... 17190441
Sep. 11, 2017  (GB) .................................... 1714571

(51) Int. Cl.
*G06T 19/00*     (2011.01)
*G06T 7/62*      (2017.01)
(Continued)

(52) U.S. Cl.
CPC ............ *G06T 19/006* (2013.01); *A42B 3/042* (2013.01); *A42B 3/22* (2013.01); *G02B 27/0172* (2013.01);
(Continued)

(58) Field of Classification Search
CPC ......... G06T 19/006; G06T 7/62; A42B 3/042; G02B 27/0172
See application file for complete search history.

(56) References Cited

U.S. PATENT DOCUMENTS 5,838,262 A    11/1998  Kershner et al.
7,212,148 B1    5/2007  Torres
(Continued)

FOREIGN PATENT DOCUMENTS

| GB | 2532465 A | 5/2016 |
| KR | 101757884 B1 | 7/2017 |
| WO | 2019048813 A1 | 3/2019 |

OTHER PUBLICATIONS

"Air and Misslie Defense Intelligence Preparation of the Battlefield", Headquarters, Department of the Army (Mar. 2016) pp. 1-90.*
(Continued)

*Primary Examiner* — Sarah Lhymn
(74) *Attorney, Agent, or Firm* — Maine Cernota & Rardin (57) ABSTRACT

An apparatus and method for displaying an operational area to an operative of a host platform, said operational area being defined within an external real-world environment relative to said host platform, the apparatus comprising a viewing device (12) configured to provide to said operative, in use, a three-dimensional view of said external real-world environment, a display generating device for creating images at the viewing device, and a processor (32) comprising an input (34) for receiving real-time first data representative of a specified target and its location within said external real-world environment and configured to receive or obtain second data representative of at least one characteristic of said specified target, the processor (32) being further configured to: use said first and second data to calculate a geometric volume representative of a region of (Continued)

influence of said specified target relative to said real-world external environment and/or said host platform, generate three-dimensional image data representative of said geometric volume, and display a three dimensional model, depicting said geometric volume and created using said three-dimensional image data, on said display generating device for creating images at the viewing device, the apparatus being configured to project or blend said three-dimensional model within said view of said external real-world environment at the relative location therein of said specified target.

14 Claims, 3 Drawing Sheets

(51) Int. Cl.
*A42B 3/04* (2006.01)
*A42B 3/22* (2006.01)
*G02B 27/01* (2006.01)
*G06F 3/14* (2006.01)
*G06T 17/05* (2011.01)

(52) U.S. Cl.
CPC .................. *G06F 3/14* (2013.01); *G06T 7/62* (2017.01); *G06T 17/05* (2013.01); *G02B 2027/014* (2013.01); *G02B 2027/0134* (2013.01); *G06T 2207/30181* (2013.01); *G06T 2207/30212* (2013.01)

(56) References Cited

U.S. PATENT DOCUMENTS

| | | | |
|---|---|---|---|
| 7,231,327 B1 * | 6/2007 | Beverina | G06Q 20/203 703/2 |
| 10,382,746 B1 | 8/2019 | Shapiro et al. | |
| 2003/0210228 A1 | 11/2003 | Ebersole et al. | |
| 2011/0106447 A1 | 5/2011 | Wise et al. | |
| 2013/0176192 A1 | 7/2013 | Varga et al. | |
| 2014/0097291 A1 | 4/2014 | Aymeric et al. | |
| 2014/0152792 A1 | 6/2014 | Krueger | |
| 2014/0240313 A1 | 8/2014 | Varga | |
| 2014/0267398 A1 | 9/2014 | Beckwith et al. | |
| 2015/0054826 A1 | 2/2015 | Varga | |
| 2017/0039765 A1 | 2/2017 | Zhou et al. | |
| 2017/0148173 A1 | 5/2017 | Kosmecki et al. | |
| 2017/0169610 A1 | 6/2017 | King | |
| 2017/0316613 A1 | 11/2017 | Wright | |

OTHER PUBLICATIONS

PCT Search Report for Application No. PCT/GB2018/000122 dated Nov. 20, 2018, 15 pages.
Great Britian Search Report for Application No. 1714571.5 dated Feb. 12, 2018, 3 pages.
Great Britian Combined Search and Examination Report for Application No. 1814678.7 dated Mar. 7, 2019, 5 pages.
Partial European Search Report for Application No. 17190441.0 dated Jan. 12, 2018, 18 pages.
International Bureau of WIPO , PCT/GB2018/000122, Mar. 26, 2020, 12 pages, European Patent Office, Geneva, Switzerland.
Partial European Search Report for Application No. 17190445.1 dated Feb. 7, 2018, 14 pages.
Great Britain Search Report for Application No. 1714573.1 dated Jun. 5, 2018, 4 pages.
Great Britain Combined Search and Examination Report for Application No. 18114671.2 dated Mar. 6, 2019, 7 pages.
International Preliminary Report on Patentability for Application No. PCT/GB2018/000123 dated Mar. 17, 2020, 10 pages.
Office Action for U.S. Appl. No. 16/643,770, dated Nov. 10, 2020, 30 Pages.
Office Action for U.S. Appl. No. 16/643,770, dated Feb. 3, 2021, 21 Pages.
Office Action for U.S. Appl. No. 16/643,770, dated Mar. 30, 2021, 5 Pages.
Office Action for U.S. Appl. No. 16/643,770 dated Jul. 6, 2021, 22 pages.
Notice of Allowance for U.S. Appl. No. 16/643,770 dated Oct. 20, 2021, 14 Pages.

* cited by examiner

APPARATUS AND METHOD FOR DISPLAYING AN OPERATIONAL AREA

RELATED APPLICATIONS

This application is a national phase application filed under 35 USC § 371 of PCT Application No. PCT/GB2018/000122 with an International filing date of Sep. 12, 2018 which claims priority of GB Patent Application 1714571.5 filed Sep. 11, 2017 and EP Patent Application 17190441.0 filed Sep. 11, 2017. Each of these applications is herein incorporated by reference in its entirety for all purposes.

FIELD OF THE INVENTION

This invention relates generally to an apparatus and method for displaying an operational area to a user and, more particularly, to an apparatus and method for displaying an external operational area in respect of a host platform, such as the external airspace of an aircraft, to an operative, e.g. the pilot, of the platform.

BACKGROUND OF THE INVENTION

It is known, particularly in the field of military fighter aircraft and the like, to provide a helmet-mounted display (HMD), wherein a helmet having a transparent visor is provided with an internal, transparent screen (or an alternative form of display generating device such as a projector and/or waveguide), such that the wearer can view their real-world environment, whilst also viewing additional images and/or data in a virtual reality format on the screen. As such, a processor is provided that receives real-time data from multiple sources, such as external image capture devices, speed sensors, weapon sensors, or target tracking systems, and generates two-dimensional image data representative of that data. The image data is projected onto the screen in the form of representative two-dimensional images, thus effectively being superimposed on the wearer's real-world field of view through the visor/screen assembly.

However, there are circumstances in which such data, or combinations of such data, may be indicative of geographical volumes, e.g. volumes of airspace, within the external real-world environment that may be of particular interest to the vehicle operative. Typical examples of such geographical volumes in the field of military fighter aircraft are Surface-to-Air Missile (SAM) Threat Zones or Missile Engagement Zones (MEZ). In known display systems, such zones can only be represented within the pilot's view of the external airspace in two dimensions at best, based on the location of the threat zone and its region of influence at the level of the host aircraft once a target has been identified. This representation is typically displayed on a heads-down display as a two-dimensional plan view of the region of influence around the location of the target. The pilot is then required to form their situational awareness of the potential three-dimensional region of influence of the target from a mental model based on information received during the pre-flight mission briefing, supplemented by information available from the above-mentioned two-dimensional plan views physically displayed in the cockpit, from verbal and data communications received in real time, and from their view of the outside world looking out of the cockpit. However, this process is inevitably prone to inaccuracies and can lead to critical strategic errors.

It would be desirable to provide a means to enable a vehicle operative to accurately visualise a three-dimensional region of interest or threat, in real-time and space, relative to the real-world external environment, and aspects of the present invention seek to address this issue by providing an alternative display apparatus and method.

SUMMARY OF THE INVENTION

Thus, in accordance with a first aspect of the present invention, there is provided a display apparatus for displaying an operational area to an operative of a host platform, said operational area being defined within an external real-world environment relative to said host platform, the apparatus comprising a viewing device configured to provide to said operative, in use, a three-dimensional view of said external real-world environment, a display generating device for creating images at the viewing device, and a processor comprising an input for receiving real-time first data representative of a specified target and its location within said external real-world environment relative to said host platform, and configured to receive or obtain second data representative of at least one characteristic of said specified target, the processor being further configured to: use said first and second data to calculate a geometric volume representative of a region of influence of said specified target relative to said real-world external environment and/or said host platform, generate three-dimensional image data representative of said geometric volume, display a three dimensional model, depicting said geometric volume and created using said three-dimensional image data, on said display generating device, the apparatus being configured to project or blend said three-dimensional model within said view of said external real-world environment at the relative location therein of said specified target.

By calculating the geometric volume representative of the region of influence of the specified target and then placing a three-dimensional image of that geometric volume within the operative's view of the external real-world environment, at the relative location of (and oriented correctly in respect of) the specified target, the operative is able to immediately accurately visualise or "see", in real time and space, the region of influence of the specified target within the external real-world environment, which in turn enables the operative to quickly plan and take any appropriate action.

The real-time first data relating to a specified target may be obtained using target detection and/or tracking technology on-board the host platform and/or one or more other platforms within the real-world external environment. Target detection and tracking technologies are known, particularly in the field of military operations, and the present invention is not necessarily intended to be specifically limited in this regard. The apparatus itself may include a target tracking and/or detection module having an output communicably coupled to the processor. However, it is more likely that the processor may be communicably coupled to an existing target detection/tracking module, which may be on-board the host platform or may, indeed, be located remotely (e.g. at a ground station or in or on another platform in the vicinity of the host platform, such that the processor receives data communications representative of a specified target from a remote location.

The processor may, in some exemplary embodiments, be configured to generate and display, in the same manner, three-dimensional models in respect of two or more respective specified targets simultaneously. This enables the host platform operative, e.g. pilot, to accurately navigate the platform around the regions of influence to avoid threats or, indeed, take effect countermeasures in respect of the regions of influence to reduce or eliminate them. The processor may be configured to predict or calculate an effect on a region of influence and, therefore, a three-dimensional model representative thereof, of a specified countermeasure, and may, thus, be configured to receive or obtain data representative of a specified countermeasure and, in the case of two or more specified targets, a respective region of influence to which the countermeasure is to be applied.

In one exemplary embodiment, the viewing device may be a transparent or translucent visor, such that the external real-world environment can be viewed by the operative through the visor, in use, wherein the display generating device is arranged and configured to project images displayed thereon onto said visor within the operative's view of said external real-world environment. In this case, the display apparatus may comprise a headset for placing over an operative's eyes, in use, and including said display generating device, or the screen may be incorporated into the windscreen of a vehicle. In an alternative exemplary embodiment, the display generating device may be a projector or screen which may be incorporated in said viewing device which may be substantially opaque, and the processor may include an input for receiving image data representative of an external real-world environment, and be configured to use said image data to display on said display generating device a three-dimensional virtual environment depicting said view of said external real-world environment. The processor may thus beneficially be configured to blend the image data representative of the one or more three-dimensional models into said virtual environment on said viewing device. In this case, the display apparatus may comprise a head-mounted display, a heads-up display or head-down display.

In an exemplary embodiment, the apparatus may be configured to enable the host platform operative, or another user, to manipulate the one or more three-dimensional models displayed on the display generating device. Thus, the apparatus may comprise a user interface configured to receive user input data representative of operations to be performed in respect of a three-dimensional model displayed on the display generating device. The user input data may, for example, be representative of a command to rotate the view displayed on the viewing device about one or more axes, thus enabling the host platform operative to obtain a view of the region of influence from alternative angles. The user input data may, alternatively or in addition, be representative of a command to view the volume of the three-dimensional model from any location within the model, thus enabling the operative to view the terrain within the region of influence of the target, and even to locate the target itself within the external real-world environment displayed.

The processor may be configured to receive or obtain terrain elevation data representative of said external real-world environment, use said terrain elevation data and at least said first data to calculate regions of intervisibility between said host platform and a specified target, and calculate said geometric volume based on said calculated regions of intervisibility.

It will be appreciated that, since the processor is utilising real-time data to calculate a geometric volume and placing a three-dimensional model of that volume in real time and space within a three-dimensional view of the external real-world environment in which the vehicle is operating, the "image(s)" of the region(s) of influence of the specified target(s) can be constantly updated to take account of changes in circumstances, such as a change of location of the host platform.

In an exemplary embodiment, the host platform is an aircraft, the specified target is a Surface-to-Air Missile and the region of influence is a Missile Threat Zone or Missile Engagement Zone. However, in accordance with some embodiments, the invention may be more generally applicable to other vehicle types in a wide variety of applications.

In an exemplary embodiment, the three-dimensional model representing the region of influence of a specified target is a wire frame model, such that the visibility of the view of the external real-world environment within which it is placed is maximised. However, the present invention is not necessarily intended to be strictly limited in this regard. For example, sufficient visibility of the view of the external real-world environment could be achieved using solid, but translucent models of the regions of influence. Indeed, any means of visually representing a three-dimensional volume in real space could be used. In some exemplary embodiments, regions of each model, and/or different models, could be displayed in different colours to provide further information to the operative relating to a respective target, its status and/or the terrain within which the region of influence is located.

In accordance with another aspect of the invention, there is provided a method of displaying an operational area to an operative of a host platform, said operational area being defined within an external real-world environment relative to said host platform, the method comprising: providing, via a viewing device, a three-dimensional view of said external real-world environment, providing a display generating device, and using a processor to receive real-time first data representative of a specified target and its location within said external real-world environment, receive or obtain second data representative of at least one characteristic of said specified target, use said first and second data to calculate a geometric volume representative of a region of influence of said specified target relative to said real-world external environment and said host platform, generate three-dimensional image data representative of said geometric volume, display a three dimensional model, depicting said geometric volume and created using said three-dimensional image data, on said display generating device, and project or blend said three-dimensional model within said view of said external real-world environment at the relative location therein of said specified target.

BRIEF DESCRIPTION OF THE DRAWINGS

These and other aspects of the invention will be apparent from the following specific description, in which embodiments of the invention are described, by way of examples only, and with reference to the accompanying drawings, in which.

DETAILED DESCRIPTION

Figure 1:
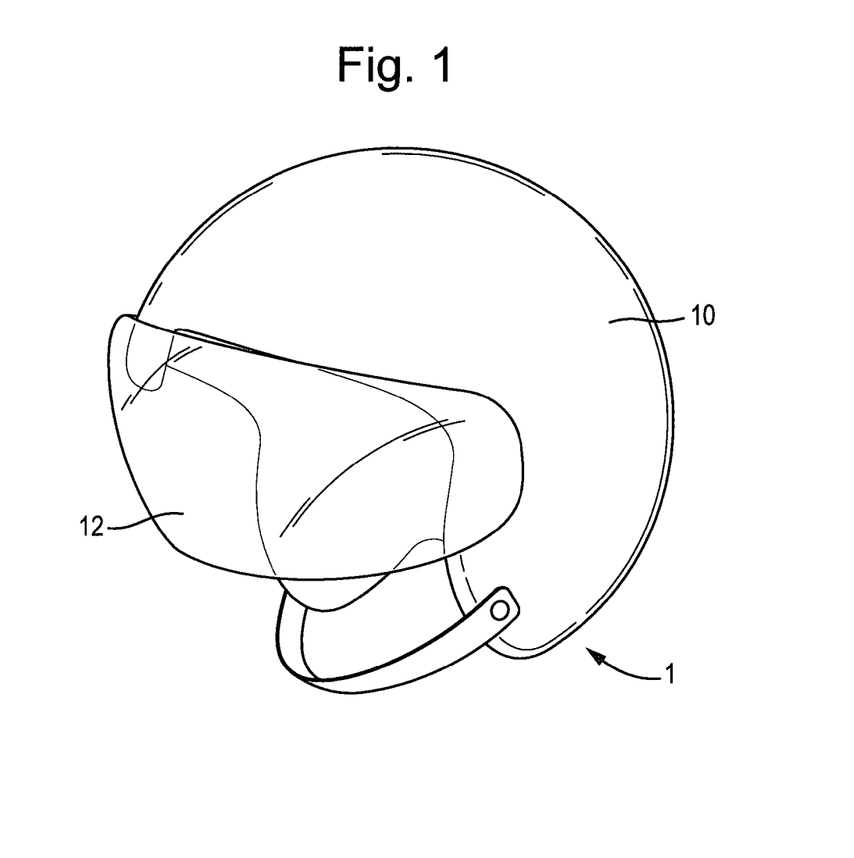
FIG. 1 is a helmet-mounted display of apparatus according to an exemplary embodiment of the present invention.

Referring to FIG. 1 of the drawings, a display apparatus according to an exemplary embodiment of the present invention comprises an integrated two-part helmet-mounted display (HMD) 1 comprising a protective helmet 10 configured, in use, to cover the crown, back and sides of a wearer's head, and a see-through (translucent or transparent) visor 12. A screen is provided in the helmet 10 and the visor 12 acts as a mirror which, together with other optical components, enables a wearer to view, on the visor within their view of the real-world environment, images displayed on the screen via reflected light. As such, the visor 12 extends between the side portions of the protective helmet 10 and is configured, in use, to cover a wearer's eyes such that they can see through the visor (and screen) and also see any symbology or images displayed on the screen. In an exemplary embodiment, the screen provides a fully overlapped, 40-degree, binocular display. This type of helmet mounted display assembly is known in the field of military aircraft.

The display apparatus of the invention includes a processor (not shown in FIG. 1), which may be incorporated into the helmet mounted display assembly 1 but is more preferably located elsewhere in the aircraft, with an interface being provided on the helmet itself and coupled to the screen to define a data link between the processor and the screen, thus avoiding the additional weight on the helmet that the processor would otherwise represent.

Weapon sensors on the host aircraft track enemy aircraft and missile (e.g. Surface-to-Air Missile [SAM]) information, and data from these sensors, as well as data from other platforms in the battle space and/or Head Quarters (HQ) can be fed to the processor. Furthermore, the helmet-mounted display may include a head tracker system, wherein target devices, e.g. transmitters such as LEDs (not shown in FIG. 1), on the helmet 10 are communicably coupled to fixed sensors on the aircraft. The sensors track the transmitters on the helmet, and generate representative signals such that the processor always 'knows' where the pilot is looking. Such target tracking and head tracking technologies are known in the art, and will not be described in any further detail herein.

It will be understood by a person skilled on the art that, in use, the wearer of the helmet-mounted display will be able to see through the visor (including the screen) 12 to obtain a view of the external (and internal) operational environment in whatever direction the wearer chooses to look. The processor, knowing the field of view of the visor and the direction in which the wearer is looking, can determine the precise operational area visible to the wearer at any time.

Figure 2:
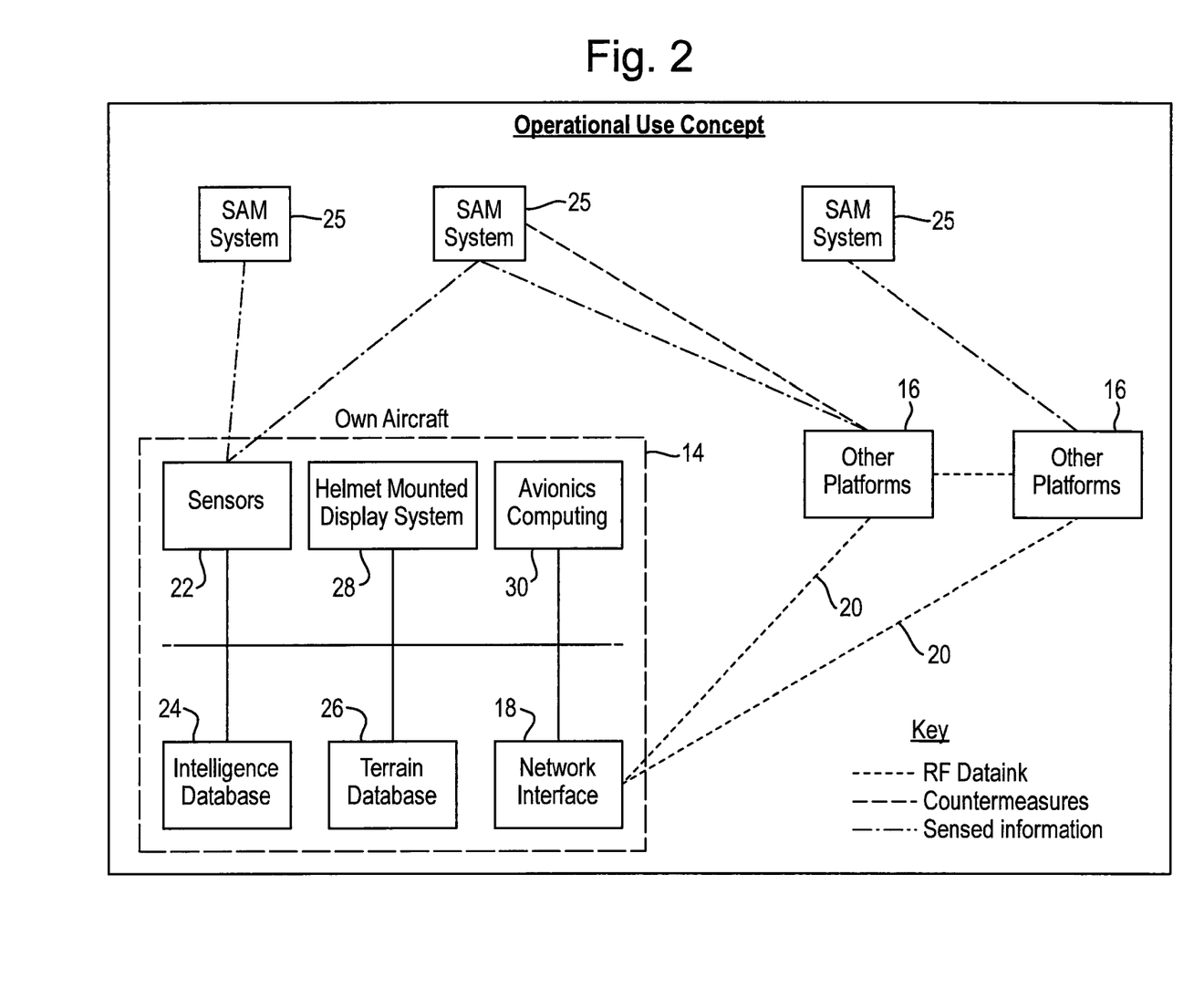
FIG. 2 is a schematic block diagram illustrating elements of an operational environment around a host platform.

Referring additionally to FIG. 2 of the drawings, there is provided a conceptual block diagram of an operational environment (internal and external) around an aircraft 14 (the "host" aircraft or platform). Other platforms operating in the same battle space are denoted by reference numeral 16. The other platforms 16 include radio frequency (RF) transmission means (not shown) and the host aircraft 14 includes a network interface 18 configured to receive data from the other platforms 16 via an associated RF data link 20.

As stated above, weapon sensors 22 are incorporated in the host aircraft 14, in conjunction with an intelligence database 24, to detect and track enemy missile (in this case, Surface-to-Air Missile 25) information. A terrain database 26, provided in the host aircraft 14, stores terrain data representative of the external environment, and is configured to provide specific terrain elevation data to the processor (not shown in FIG. 2) included within the helmet-mounted display system 28, based on the external operational area visible to the wearer (determined using the above-mentioned head tracker system (not shown), knowledge of the field of view of the visor, position and altitude data in respects of the host aircraft 14, etc.).

Thus, it can be seen that, depending on the precise external operational area visible to the wearer of the helmet-mounted display assembly illustrated schematically in FIG. 1 of the drawings, the processor associated with the display apparatus can receive, in real time, terrain elevation data and data representative of the location and characteristic(s) of one or more Surface-to-Air Missiles 25 in the area (from any or all of the intelligence database 24, other platforms 16 or HQ). For completeness, the computer system(s) controlling the aircraft's electronics systems is depicted generally an avionics computing module 30.

Figure 3:
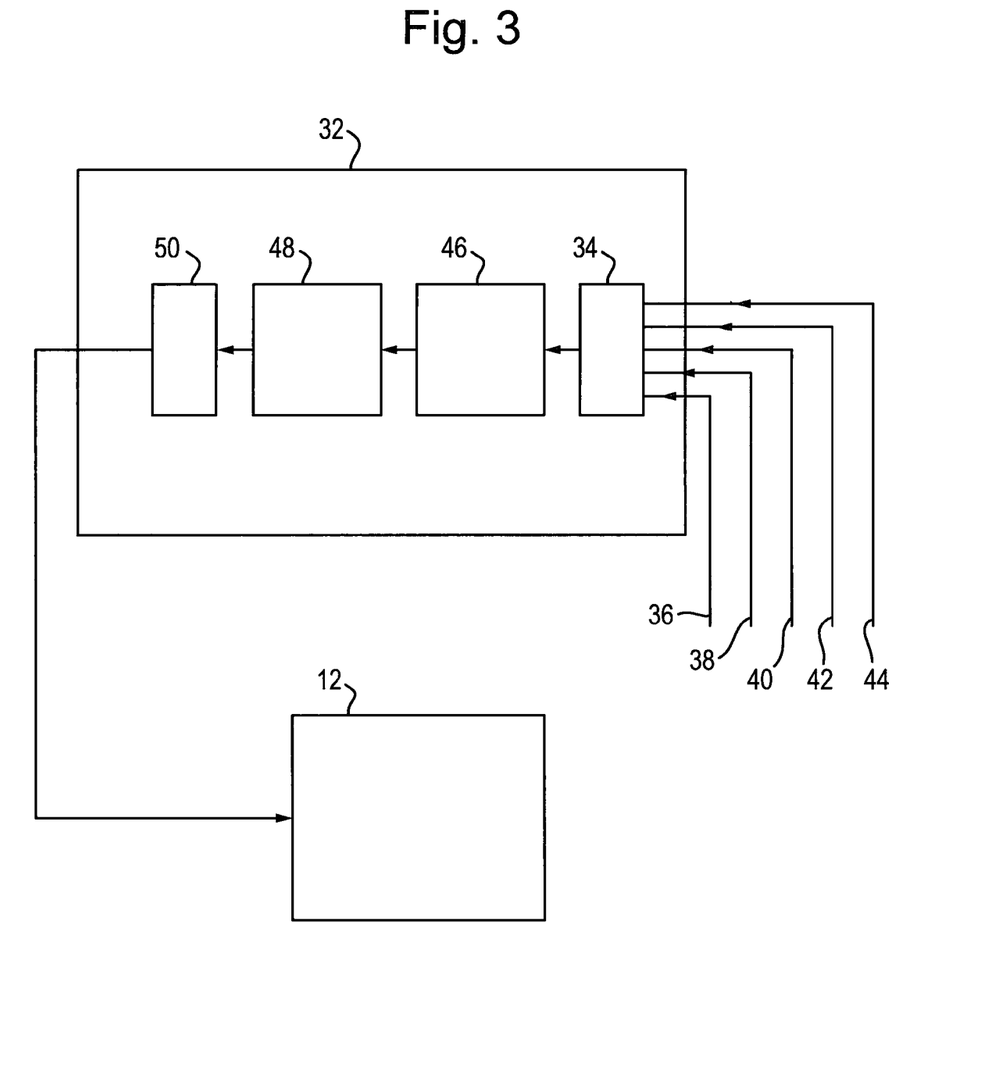
FIG. 3 is a schematic block diagram of a display apparatus according to an exemplary embodiment of the present invention, illustrating principal elements of a processor thereof.

Referring now to FIG. 3 of the drawings, a processor 32 of a display apparatus according to an exemplary embodiment of the present invention comprises an input interface 34 configured to receive real-time data from various sources. In the illustrated block diagram, the following inputs are depicted schematically:

36: input data from the head tracker system for providing data as to where the pilot is looking and also to provide an indication that they have moved their head (which may trigger an updated calculation); this data will also have been provided to the above-mentioned terrain database, which is configured to extract terrain elevation data relating to the pilot's current field of view. In addition, of course, data representative of the position and altitude of the host platform will be required to determine exactly where in the outside world the pilot is looking.

38: input data from the terrain database comprising the terrain elevation data corresponding to the pilot's current field of view.

40: input data from the on-board target detection and tracking systems, comprising data representative of threats and their ground level locations; this data may also include key characteristics relating to the specific threat, although this information may, additionally or alternatively, come from elsewhere (e.g. HQ, pre-mission briefing, other platforms).

42: input(s) from other platforms and/or Head Quarters (HQ), via the above-mentioned network interface 18. These inputs may comprise data representative of threats and their ground level locations (and, optionally, key characteristics related thereto).

44: optionally, inputs may be received from other sources and systems, comprising data that may be used in calculating the geometric volume representing a Missile Threat Zone or Missile Engagement Zone (MEZ) associated with a specific SAM. This calculation also requires knowledge of the position and altitude of the host platform.

The processor 32 further comprises a calculation module 46 configured to process the input data from the input interface 34 and thereby calculate, based on the location of the specified SAM, its characteristics (e.g. range) and the terrain elevation around its location (to determine regions of intervisibility), a geometric volume representative of the associated Missile Threat Zone represented by the specified SAM in relation to the host aircraft at its current location.

Data representative of the above-mentioned geometric volume is then passed to an image data generation module 48, which generates image data configured to cause the geometric volume to be output (via interface 50) and displayed, for example as a wireframe model, on the screen 12 of the helmet-mounted display such that it is scaled and superimposed on the wearer's view of the outside world at the precise location therein of the specified SAM and sized and oriented to match the real-world situation. Thus, the pilot can immediately "see", not only the location of the threat, but also the extent to which it poses a threat to the host platform at its current, or potential future, location, i.e. the volume of airspace that poses a threat to the host aircraft from the specified SAM.

The pilot may decide to navigate the aircraft to another location, avoiding the threat zones thus represented. Alternatively, the pilot may wish to investigate one or more of the threat zones further, for example, with a view to planning countermeasures in relation to the respective SAM. In this case, the pilot may wish to manipulate their view of the displayed three-dimensional volume representing a threat zone, by rotating the wireframe model about one or more axes. The apparatus may be configured to manipulate the surrounding external environment (viewed through the visor) accordingly, to give the impression of "flying around" the threat zone, without physically moving the host aircraft. The pilot may also be able to view the threat zone from the inside. These manipulation techniques are known in relation to standard image processing systems and will not be described further herein.

Thus, in general, an exemplary embodiment of the invention provides an apparatus and method for vehicle operatives to visualise threat zones in real time and space outside the vehicle. These threat zones are depicted on a screen, within a view of the vehicle operative's current field of view, as geographical or threat volumes representing volumes of airspace in which the vehicle is threatened. The apparatus and method utilise intelligence data representative of the location and capability of a detected threat (e.g. SAM) and combine this data with data obtained from the vehicle's own sensors (either passive or active) and data received via RF data links from sensors or intelligence systems associated with other platforms, based on observations of the operational area.

The available data is fused together in the calculation module 46 and processed, together with terrain elevation data, to identify volumes of airspace where a SAM, for example, may threaten the host platform and, therefore, also volumes of airspace in which it is not threatened. These "threat volumes" may represent volumes in which the sensors of a detected threat would be predicted to detect the host platform intervisibility and where the weapons used by the threat would be capable of intercepting the host platform, taking into account terrain elevation data. It is envisaged that, by using a range of sensed data, it may be possible to determine whether a threat radar is active or passive and whether weapons have been launched.

This processing allows a three-dimensional visual representation of one or more threat zones to be rendered in (for example) a stereoscopic colour helmet-mounted display, thereby allowing the vehicle operative (e.g. pilot of an aircraft) to visualise, in real time and space, threat zones (of, for example, respective SAM systems encountered). In an exemplary embodiment, different colours and/or other visual discriminators may be used in the displayed image of various threat zones to convey to the vehicle operative the status of the threat zones, such that the highest risk zones may be depicted and avoided.

Where multiple threats are encountered, the apparatus and method of exemplary embodiments of the invention may allow vehicle operators to easily visualise volumes of airspace that are free from threat in order to enable them to safely navigate through defensive shields to achieve assigned mission goals. If the vehicle is within a threat zone, the apparatus may b configured to provide visual cues of the presence of the threat and also the best route by which to leave the threat zone and move to safe volumes of airspace.

It will be appreciated that the visual depiction of threat zones will need to be updated in order to maintain an accurate display of the threat zones in real time and space. Such updates may occur periodically, or in response to a positive command or signal from the vehicle operative. In exemplary embodiments of the invention, updates may be triggered by an associated event, for example, movement of the vehicle operative's head, change of location/altitude of the vehicle, detection of a new threat (or the disappearance of an earlier threat), countermeasures effected in respect of an existing threat, etc. The apparatus may be configured to allow the vehicle operative to turn the threat zone functionality on and off as required, thus ensuring that, when required, the vehicle operative has an unobstructed view of the external or internal environment.

Whilst the invention has been described above, in relation to a head-mounted display assembly, particularly for use in military fighter aircraft applications, it will be apparent to a person skilled in the art, from the foregoing description, that modifications and variations could be made to the described embodiments, without departing from the scope of the invention as defined by the appended claims.

For the purposes of the following non-exhaustive list of alternative embodiments, it is to be understood that the term "augmented reality" is intended to refer to a system in which image data displayed on a see-through screen such that it is superimposed on a user's real-world view of their environment, whereas the term "virtual reality" is intended to refer to a system where a virtual environment is depicted on an opaque screen (for example, a rendered image of the external or internal environment in which an operative and/or vehicle is located) and additional (information) image data is blended into the virtual environment. As previously stated, some exemplary embodiments of the invention may be more generally applicable to operators of other vehicle types and in a wide variety of applications.

Thus, a first alternative exemplary embodiment of the present invention could provide an augmented reality display apparatus configured to provide situational awareness of other non-visual information (other than threats), such as aeronautical data in a military or civil aircraft. Similarly, augmented reality apparatus may be provided to support operational training in an airborne environment by projecting synthetic cooperating, neutral and opposing assets into the pilot's view.

In a second alternative exemplary embodiment, a virtual reality headset may be provided to provide a similar level of situational awareness to the operator of an unmanned aerial (or other) platform. Thus, in this case, the unmanned platform may include one or more image capture device for capturing images of their external environment and transmitting data representative thereof to the ground station system. The apparatus may include an image processing module for processing the image data received from the image capture devices, rendering it, and displaying the unmanned vehicle's environment as a virtual environment on an opaque screen within a helmet-mounted display assembly. One or more geometric volumes may be calculated in the manner described above, and image data representative thereof may be blended into the virtual environment at the appropriate locations therein, so as to provide a remote operative with situational awareness of the environment in which the unmanned vehicle is operating.

In yet another exemplary embodiment, a virtual reality head-mounted display may be provided to support mission planning, briefing and rehearsal, or to support operational training in a ground-based environment by projecting a synthetic environment including cockpit displays and the outside world, and including synthetic cooperating, neutral and opposing assets into the training pilot's view.

Embodiments described above disclose the use of a screen as the display generating device, configured for relaying light to the viewing device (e.g. visor) and thereby creating human-viewable images. However, as an alternative to a screen, other devices for relaying light to the viewing device and creating images may be provided. In particular, projector technologies and/or optical waveguide technologies could be utilised.

The invention claimed is:

1. A display apparatus that is able to display an operational area to an operative of a host platform that is a vehicle, said operational area being defined within an external real-world environment relative to said host platform, the apparatus comprising:
   a viewing device configured to provide to said operative, in use, a three-dimensional view of said external real-world environment;
   a display generating device for creating images at the viewing device; and
   a processor comprising an input for receiving real-time first data representative of a specified hostile target and its location within said external real-world environment and configured to receive or obtain second data representative of at least one characteristic of said specified target, the processor being further configured to:
      use said first and second data to calculate in real time a geometric volume representative of a region of influence of said specified target relative to said real-world external environment and relative to the real-time location of the target, said target being a threat to the host platform during navigation of the host platform if the host platform enters its region of influence;
      generate three-dimensional image data representative of said geometric volume, and display a three-dimensional model, depicting said geometric volume and created using said three-dimensional image data, on said display generating device, the apparatus being configured to project or blend said three-dimensional model into said view of said external real-world environment at the relative location therein of said specified target; and
      predict or calculate an effect on the region of influence, and display on the display generating device a three-dimensional model representative thereof, of a specified countermeasure, said specified countermeasure being an alternative to navigating the host platform so as to avoid the region of influence.

2. The display apparatus according to claim 1, wherein the real-time first data relating to a specified target is obtained using target detection and/or tracking technology on-board the host platform and/or one or more other platforms within the real-world external environment.

3. The display apparatus according to claim 2, comprising a target tracking and/or detection module having an output communicably coupled to the processor.

4. The display apparatus according to claim 2, wherein the processor is communicably coupled to a remote target detection/tracking module, on-board the host platform or elsewhere.

5. The display apparatus according to claim 1, wherein the processor is configured to generate and display three-dimensional models in respect of two or more respective specified targets simultaneously.

6. The display apparatus according to claim 1, wherein the processor is further configured to receive or obtain data representative of the specified countermeasure and, in the case of two or more specified targets, a respective region of influence to which the countermeasure is to be applied.

7. The display apparatus according to claim 1, wherein the viewing device is a transparent or translucent visor, such that the external real-world environment can be viewed by an operative through the viewing device, in use, and said display generating device is arranged and configured relative to said visor to project images displayed thereon onto said visor so as to superimpose said images onto the operative's view of the external real-world environment.

8. The display apparatus according to claim 7, comprising a headset for placing over an operative's eyes, in use, and including said display generating device.

9. The display apparatus according to claim 1, wherein the display generating device is incorporated in the viewing device which is substantially opaque, and the processor includes an input for receiving image data representative of an external real-world environment, and is configured to use said image data to display on said display generating device a three-dimensional virtual environment depicting a view of an external real-world environment.

10. The display apparatus according to claim 9, wherein the processor is configured to blend the image data representative of the one or more three-dimensional models into said virtual environment on said display generating device.

11. The display apparatus according to claim 1, comprising a user interface configured to receive user input data representative of operations to be performed in respect of a three-dimensional model displayed on the display generating device.

12. The display apparatus according to claim 1, wherein the processor is configured to receive or obtain terrain elevation data representative of said external real-world environment, use said terrain elevation data and at least said first data to calculate regions of intervisibility between said host platform and a specified target, and calculate said geometric volume based on said calculated regions of intervisibility.

13. The display apparatus according to claim 1, wherein the three-dimensional model depicting the region of influence of a specified target is a wire frame model or at least partially translucent, and, optionally, wherein regions of each model, and/or different models, are displayed in different colours based on its status and/or the terrain within which the region of influence is located.

14. A method of displaying an operational area to an operative of a host platform that is a vehicle, said operational area being defined within an external real-world environment relative to said host platform, the method comprising:
   providing, via a viewing device, a three-dimensional view of said external real-world environment;
   providing a display generating device; and
   using a processor to:
      receive real-time first data representative of a specified hostile target and its location within said external real-world environment;
      receive or obtain second data representative of at least one characteristic of said specified target;
      use said first and second data to calculate in real time a geometric volume representative of a region of influence of said specified target relative to said real-world external environment and relative to the real-time location of the target, said target being a threat to to the host platform during navigation of the host platform if the host platform enters its region of influence;

generate three-dimensional image data representative of said geometric volume;

display a three-dimensional model, depicting said geometric volume and created using said three-dimensional image data, on said display generating device;

project or blend said three-dimensional model into said three-dimensional view of said external real-world environment at the relative location therein of said specified target; and predict or calculate an effect on the region of influence, and display on the display generating device a three-dimensional model representative thereof, of a specified countermeasure, said specified countermeasure being an alternative to navigating the host platform so as to avoid the region of influence.

\* \* \* \* \*